United States Patent
Fukita et al.

[11] Patent Number: 5,831,363
[45] Date of Patent: Nov. 3, 1998

[54] SCANNER MOTOR

[75] Inventors: Taku Fukita, Tokyo; Mikio Nakasugi, Tama; Isshin Sato, Yokohama, all of Japan

[73] Assignee: Canon Kabushiki Kaisha, Tokyo, Japan

[21] Appl. No.: 571,196

[22] Filed: Dec. 12, 1995

[30]     Foreign Application Priority Data

Dec. 15, 1994  [JP]  Japan ..................................... 6-333511
Aug. 25, 1995  [JP]  Japan ..................................... 7-240776

[51] Int. Cl.⁶ .............................. H02K 5/16; H02K 7/09; H02K 7/14
[52] U.S. Cl. .......................... 310/91; 310/67 R; 310/90.5
[58] Field of Search ..................... 310/67 R, 90, 310/91, 90.5; 359/198, 200, 217, 225, 226, 876, 877

[56]           References Cited

U.S. PATENT DOCUMENTS

| | | | |
|---|---|---|---|
| 4,512,626 | 4/1985 | Kamiya et al. ............................ 359/200 |
| 4,523,800 | 6/1985 | Yamashita et al. ........................ 310/90 |
| 4,607,908 | 8/1986 | Ishida et al. ............................ 359/200 |
| 4,717,223 | 1/1988 | Ishida et al. ............................ 359/200 |
| 4,934,781 | 6/1990 | Kato et al. ............................. 310/90.5 |
| 5,069,515 | 12/1991 | Itami et al. ............................. 310/90 |
| 5,097,164 | 3/1992 | Nakasugi et al. ......................... 310/90 |
| 5,325,006 | 6/1994 | Uno et al. .............................. 310/90 |
| 5,430,570 | 7/1995 | Takahashi .............................. 310/90.5 |

FOREIGN PATENT DOCUMENTS

| | | | |
|---|---|---|---|
| 0410293 | 1/1991 | European Pat. Off. ....... H02K 21/22 |
| 0581278 | 2/1994 | European Pat. Off. ......... H02K 5/16 |
| 0 606 887 A1 | 7/1994 | European Pat. Off. . |
| 3325984 | 2/1984 | Germany ...................... H02K 5/16 |

OTHER PUBLICATIONS

Patent Abstracts of Japan, vol. 17, No. 608, published Nov. 9, 1993, English Abstracts of Japanese Patent No. 5–184115.

*Primary Examiner*—Clayton E. Laballe
*Attorney, Agent, or Firm*—Fitzpatrick, Cella, Harper & Scinto

[57]              ABSTRACT

An inner rotor type scanner motor rotating a rotary polygon mirror for deflection scanning is composed of two units, a rotary unit and a stationary unit. Then balancing can readily be achieved on two planes of the rotary polygon mirror and a drive magnet of the motor. The rotary unit is arranged in such a manner that a motor housing holds a bearing of a rotary member to which the rotary polygon mirror and drive magnet are fixed, and the stationary unit is arranged in such a manner that a stator coil and a magnetic member are mounted on a base.

16 Claims, 3 Drawing Sheets

SCANNER MOTOR

BACKGROUND OF THE INVENTION

1. Field of the Invention

The present invention relates to an inner rotor type scanner motor used in scanning optical apparatus provided with a rotary polygon mirror for scanning a light beam on a photosensitive member.

2. Related Background Art

Recently, there has been a demand for a scanner motor used in a scanning optical apparatus which can be rotated at a high speed or with high accuracy, and particularly in the case of laser beam printers, etc., balance correction (balancing) for a rotary member is indispensable in order to achieve a high-accuracy deflection scanning apparatus. In order to decrease windage loss or the like to achieve high-speed rotation, an inner rotor type scanner motor with small inertia or the like is frequently used rather than an outer rotor type scanner motor. A conventional example of the inner rotor type scanner motor is a drive motor, as shown in FIG. 6, which has a motor housing 27 and a bearing portion consisting of a stationary shaft 21 held by the motor housing 27 and a rotary sleeve 22 and in which a stator 28 opposed to a drive magnet 26 and a motor board 29 to which electric components, etc., are attached, are installed on the motor housing 27.

The above conventional example, however, had the following drawbacks. In the above conventional example the drive magnet is surrounded by the stator coil in the structure of the inner rotor motor. Thus, when balancing of the motor is achieved in two planes, i.e. on the rotary polygon mirror 24a and on the drive magnet 26a, drive-magnet-side balancing is carried out in the case of a hydrodynamic bearing after the rotary sleeve side is pulled out. This is not so preferred in view of the possibility of intrusion of foreign matter into the bearing in assembling and in pulling-out and putting-in of the rotary sleeve. When the bearing portion is a ball bearing, the drive magnet is fixed through the rotary shaft on the stator side, and it is thus difficult to separate it from the stator side, which makes correction hard.

SUMMARY OF THE INVENTION

An object of the present invention is to solve the above problems and then to provide a scanner motor which permits easy two-plane balancing even if it is of the inner rotor type.

The other objects of the present invention will become apparent by specific embodiments as described below.

DESCRIPTION OF THE PREFERRED EMBODIMENTS

The embodiments of the present invention will be explained with reference to the drawings.

(Embodiment 1)

Figure 1:
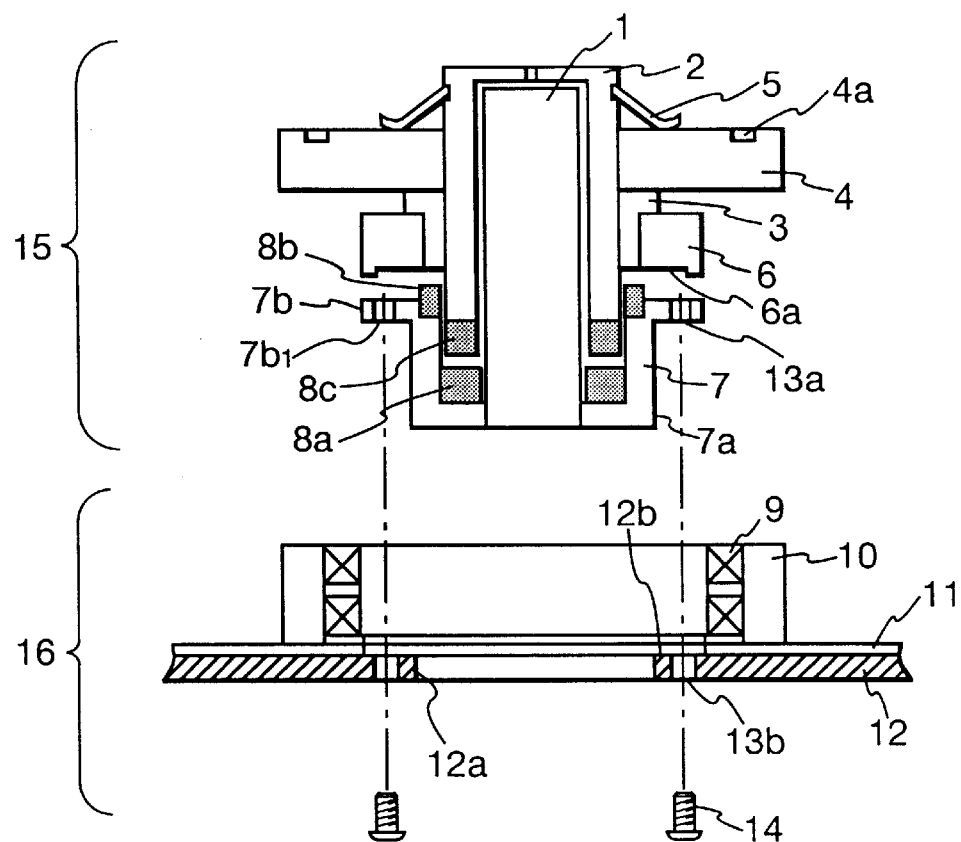
FIG. 1 is a sectional view of a first embodiment of the present invention, illustrating a separated state of a rotary part and a stationary part of an inner rotor type scanner motor for a scanning optical apparatus.

FIG. 1 is a sectional view of a separated state of two portions comprising an inner rotor type scanner motor for a scanning optical apparatus according to the present invention. In FIG. 1, the two portions of the inner rotor type scanner motor are a rotary part 15 and a stationary part 16. The rotary part 15 has a bearing portion in which a rotary sleeve 2 is rotatably fit around a stationary shaft 1, a stationary member 3 fixed on the periphery of the rotary sleeve 2 by known means, such as shrinkage fit, and made of a metal material such as aluminum or brass, a rotary polygon mirror 4 fixed to the stationary member 3 by a plate spring 5, and a drive magnet 6 fixed to the stationary member 3. Further, the stationary shaft 1 is fixed in the bottom of a cup-shaped motor housing 7. Bonded by an adhesive or the like to the lower part of the motor housing 7 is a permanent magnet 8a for floating the rotary sleeve 2 by a repulsive force against a permanent magnet 8c attached to the lower part of the rotary sleeve 2. Bonded by an adhesive or the like to the upper part of the motor housing is a permanent magnet 8b for restricting floating of the rotary sleeve 2 by a repulsive force against the permanent magnet 8c attached to the rotary sleeve 2. The bearing portion in the present embodiment is a hydrodynamic cylindrical bearing having no groove on the stationary shaft 1, but it may be a hydrodynamic bearing with vertical grooves or herringbone grooves on the stationary shaft.

Next, the stationary part 16 has a stator coil 9 to be located opposed to the drive magnet 6 in the rotary part 15 after being assembled, a magnetic laminate 10 placed on the outer periphery of the stator coil 9, a circuit board 11 on which these members are placed, and a base 12 composed of a sheet metal for supporting the circuit board 11. In FIG. 1, reference numeral 13a designates screw holes formed in the motor housing 7, and reference numeral 13b designates screw holes formed in the base 12. Using these screw holes, the rotary part 15 and stationary part 16 are coupled with each other by screws 14. Here, a circumferential surface 7a of the housing 7 in the rotary part 15 is processed with high precision so as to be coaxial with the stationary shaft 1. Three mount portions 7b extend from three positions of the peripheral edge of the housing 7 perpendicularly to the stationary shaft 1. Mount faces $7b_1$ of the mount portions 7b are processed with high precision. Further, an inner circumferential surface 12a and a mount surface 12b of the base 12 in the stationary part 16 are also processed with high precision. Thus, the rotary part 15 and stationary part 16 are coupled with each other by fitting with little play in the circumferential direction, which keeps the position accuracy of the stationary shaft 1 high and which can control inclination little. Therefore, the accuracy can be maintained at the same level as that in the case where they are formed in an integral manner. Further, if positioning pins (not shown) are also used in addition to the fitting, higher-accuracy positioning becomes possible.

Figure 2:
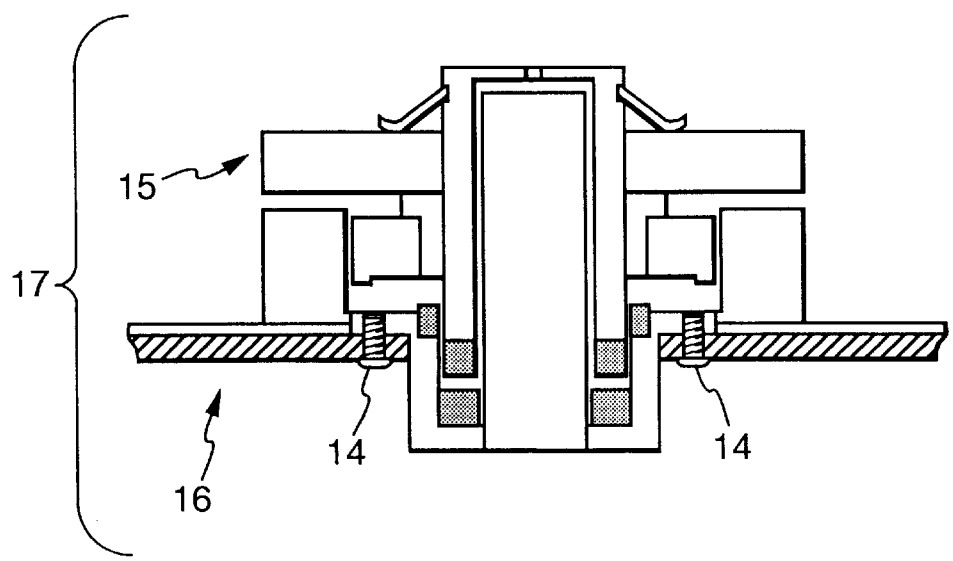
FIG. 2 is a sectional view of a combined state of the scanner motor separated in FIG. 1.

FIG. 2 is a sectional view to show the coupled state of the rotary part 15 and the stationary part 16, which are coupled by screws 14. The coupling method is not limited to screwing, but may be any other method, for example coupling by spring or adhesion.

Figure 3:
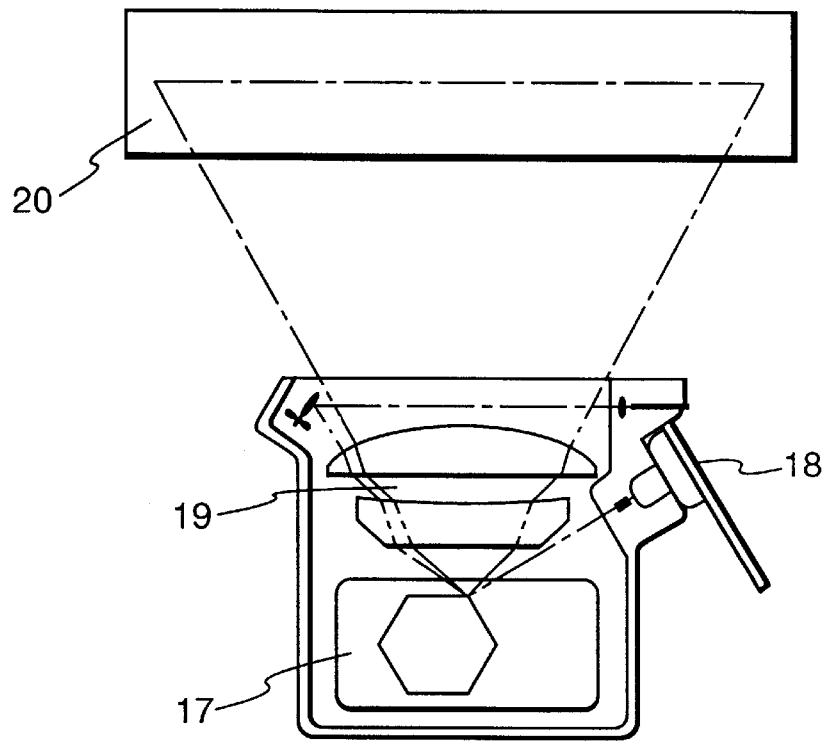
FIG. 3 is a plan view of a scanning optical apparatus using the scanner motor shown in FIG. 1 and FIG. 2.

As shown in FIG. 3, the inner rotor type scanner motor 17 deflects and scans a laser beam emitted from a laser unit 18 toward a lens group 19, and the lens group 19 focuses the beam to scan a photosensitive member 20. For two-plane balancing of the inner rotor type scanner motor 17 with two planes of a balancing groove 4a on the rotary polygon mirror 4 and a balancing groove 6a in the bottom of the drive magnet 6, a balancing weight cannot be added in the balancing groove 6a on the drive magnet side in the coupled state of the rotary part 15 and the stationary part 16, as shown in FIG. 2, but the balancing weight can be added to the balancing groove 6a in the separate state of the rotary part 15 from the stationary part 16, as shown in FIG. 1.

Figure 4:
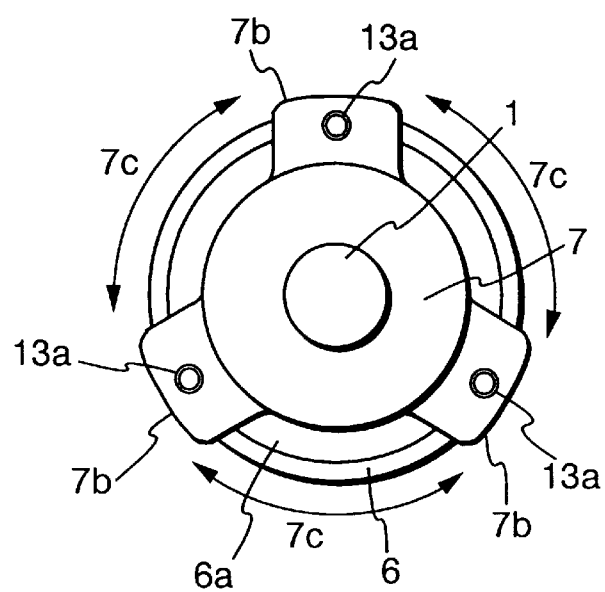
FIG. 4 is a bottom view of the scanner motor shown in FIG. 1 and FIG. 2.

An example of the balancing weight is an ultraviolet-curing adhesive or the like. In order to facilitate application of the adhesive when the adhesive is applied using for example a dispenser or the like, opening portions 7c are provided between the mount portions 7b of the motor housing 7 in the rotary part 15, as shown in the bottom view of the motor housing 7 in FIG. 4.

The rotating sleeve 2 experiences a floating force by repulsion between the permanent magnet 8c attached to the rotary sleeve and the permanent magnet 8a attached to the motor housing 7. Further, the permanent magnet 8b attached to the motor housing 7 restricts the position of the rotary sleeve 2 due to vibration and restricts the height of the rotary sleeve 2 in the thrust direction thereof, and control of the positions of a the mount heights of the permanent magnets 8a, 8b to the motor housing 7 can also achieve control of the height of the rotary polygon mirror 4 attached to the rotary sleeve only on the side of the rotary part 15.

This permits easy achievement of two-plane balancing in the inner rotor type scanner motor without having to pull the rotary sleeve out from the stationary shaft, thus preventing foreign matter, such as dust from intruding into between the rotary sleeve and the stationary shaft. Further, the rotary sleeve comes to float by repulsion of the permanent magnet 8c to support the weight in the thrust direction, and the height position of the rotary sleeve, that is, the height of the rotary polygon mirror attached to the rotary sleeve can be controlled by controlling the relative heights of the permanent magnet 8a for repulsion attached to the housing and the permanent magnet 8b for restricting it from above when mounted to the motor housing.

(Embodiment 2)

Figure 5:
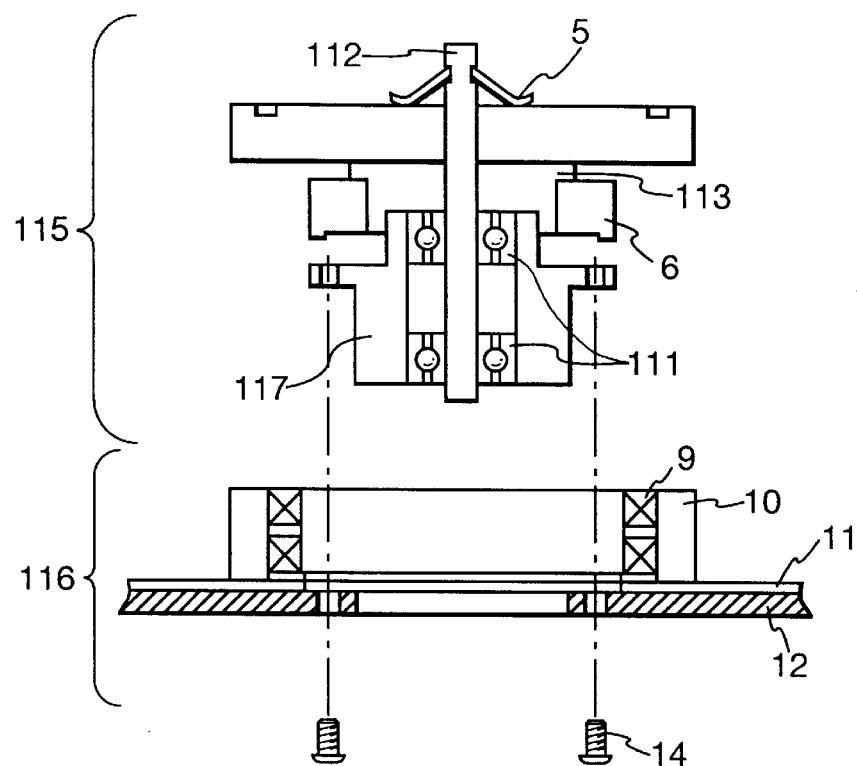
FIG. 5 is a sectional view of a second embodiment of the present invention, illustrating a separated state of a rotary part and a stationary part of a scanner motor for scanning optical apparatus.
Figure 6:
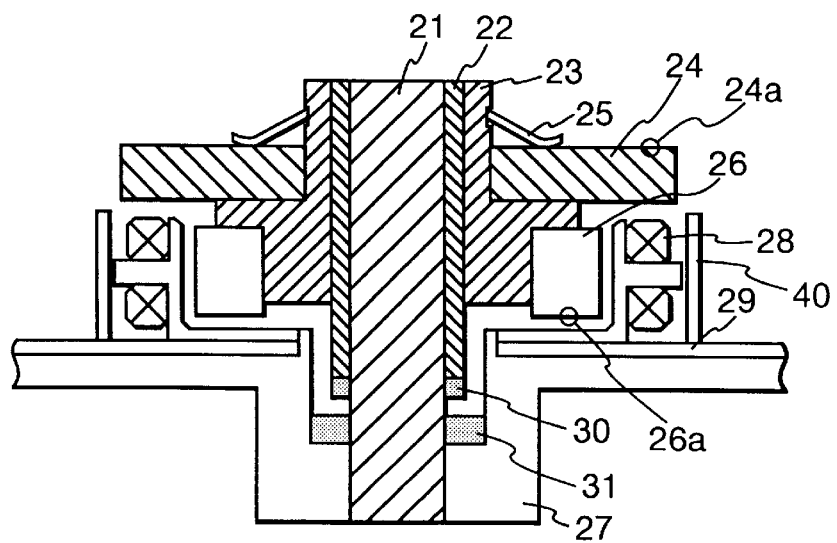
FIG. 6 is a sectional view of a conventional example of the inner rotor type scanner motor.

FIG. 5 is a sectional view showing a separated state of a rotary part 115 and a stationary part 116 of a scanning optical apparatus using an inner rotor type scanner motor of Embodiment 2 of the present invention. The same members with the same functions as those in FIG. 1 will be denoted by the same reference numerals hereinafter and the description thereof is omitted. In FIG. 5, the inner rotor type scanner motor is composed of the rotary part 115 and the stationary part 116. The rotary part 115 is arranged in such a manner that a rotary shaft 112 is rotatably supported by ball bearings 111, a stationary member 113 is fixed to the rotary shaft 112 by means such as shrinkage fit, the rotary polygon mirror 4 is fixed to the stationary member 113 by the plate spring 5, and the drive magnet 6 is fixed to the stationary member 113 by means such as adhesion.

The ball bearings 111 are fixed to a motor housing 117. The stationary part 116 is composed of the stator coil 9 which comes to be located opposed to the drive magnet 6 in the rotary part 115 when the motor is assembled, the magnetic laminate 10 located on the outer periphery thereof, the circuit board 11 on which these members are placed, and the base 12 for supporting the bottom of the circuit board 11. The rotary part 115 and the stationary part 116 are coupled with each other for example by screws 14, but any other method may be employed, for example, using means such as spring or adhesion.

This arrangement enables easy balancing in two planes on the upper part of the rotary polygon mirror and on the drive magnet, which used to be fixed through the drive magnet on the stator side and used to be incapable of being separated from the stator side in the case of the inner rotor type scanner motor using the ball bearings.

As explained above, the present invention involves the arrangement in which the scanner motor is constructed of two separate units of the rotary part and the stationary part, thereby presenting the following advantages. It solves the problems in the conventional example of the inner rotor type scanner motor to facilitate two-plane balancing. In the case of the inner rotor type scanner motor of hydrodynamic bearing, foreign matter can be prevented from intruding into the motor upon pulling the rotary sleeve out from the stationary shaft or putting it onto the stationary shaft. Further, the height of the magnetically floating rotary sleeve can be controlled by controlling the relative heights of the magnets attached to the motor housing. That is, by attaching one of the floating magnets and the upper stop magnet both onto the housing, the floating position of the rotary sleeve can be determined by the processing dimensions of the housing.

In addition, the inner rotor type scanner motor using the ball bearings is also constructed in the separate motor arrangement consisting of the two separate units, which permits easy two-plane balancing on the rotary polygon mirror and on the drive magnet.

What is claimed is:

1. An inner rotor type scanner motor for driving a rotary polygon mirror for deflection scanning to rotate, comprising:

a rotary part having
   (a) a bearing,
   (b) a motor housing for holding said bearing, said motor housing having a first mount portion,
   (c) a rotary member arranged as rotatable relative to said bearing,
   (d) a rotary polygon mirror fixed to said rotary member, said rotary polygon mirror having a first rotation correcting portion, and
   (e) a drive magnet fixed to said rotary member in order to rotate said rotary member, said drive magnet having a second rotation correction portion; and a stationary part which is one of two parts of which said motor is composed, said rotary part being the other part of which said motor is composed, wherein said stationary part comprises a second mount portion to be mounted to the first mount portion of said rotary part to achieve coupling of said stationary part with said rotary part, and wherein said stationary part has,
   (f) a stator coil opposed to said drive magnet and located on a side of the outer periphery of the drive magnet, when said rotary and stationary parts are coupled together,
   (g) a magnetic member disposed around said stator coil, and
   (h) a base on which said stator coil and said magnetic member are mounted, said base having said second mount portion, whereby said rotary part may be separated from said stationary part to permit access to said second correction portion without requiring disassembly of said bearing.

2. The scanner motor according to claim 1, wherein said first mount portion of the rotary part and said second mount portion of the stationary part each have respective mount surfaces to become respective mount references and wherein the mount surfaces are set to fit with each other and then are screwed to each other.

3. The scanner motor according to claim 2, wherein an outer peripheral surface of the motor housing of said rotary part is processed with high precision, wherein said base of said stationary part has a hole, wherein an inner peripheral surface of the hole in said base is processed with high precision, and wherein said motor housing is set to fit in the hole of said base upon coupling of said stationary part with said rotary part.

4. The scanner motor according to claim 1, wherein said rotary member is a rotary sleeve.

5. The scanner motor according to claim 4, wherein said bearing is a hydrodynamic bearing.

6. The scanner motor according to claim 1, wherein said rotary member is a rotary shaft.

7. The scanner motor according to claim 6, wherein said bearing is a ball bearing.

8. The scanner motor according to claim 1, further comprising a circuit board provided on said base, wherein said stator coil and said magnetic member are mounted on said circuit board.

9. An inner rotor type scanner motor comprising:
   a rotary unit provided with a first mount portion, said rotary unit having
      (a) a stationary shaft,
      (b) a motor housing to which said stationary shaft is fixed, said motor housing having said first mount portion,
      (c) a rotary sleeve arranged as rotatable relative to said stationary shaft,
      (d) a bearing for making said rotary sleeve rotatable relative to said stationary shaft,
      (e) a rotary polygon mirror fixed to said rotary sleeve, said rotary polygon mirror having a first rotation correcting portion, and
      (f) a drive magnet fixed to said rotary sleeve in order to rotate said rotary sleeve, said drive magnet having a second rotation correcting portion; and
   a stationary unit which is one of two units of which said motor is composed, said rotary unit being the other unit of which said motor is composed, wherein said stationary unit comprises a second mount portion to be mounted to said first mount portion of said rotary unit in order to achieve coupling of said stationary unit with said rotary unit, and wherein said stationary unit has,
      (g) a stator coil opposed to said drive magnet and located on a side of the outer periphery of said drive magnet when said rotary and stationary units are coupled,
      (h) a magnetic member disposed around said stator coil, and
      (i) a base on which said stator coil and said magnetic member are mounted, said base having a hole in which said motor housing is set to fit and having said second mount portion to be mounted to the first mount portion of said rotary unit,
   whereby said rotary part may be separated from said stationary part to permit access to said second correction portion without requiring disassembly of said bearing.

10. An inner rotor type scanner motor comprising:
    a rotary unit having
       (a) a stationary shaft,
       (b) a motor housing formed in a substantially cup shape, said motor housing having a first mount portion for fixing said stationary shaft in a bottom portion thereof so that an outer peripheral surface of said motor housing may be coaxial with said stationary shaft, said first mount portion extending from a peripheral edge of said motor housing so as to be perpendicular to said stationary shaft,
       (c) a rotary sleeve arranged as rotatable relative to said stationary shaft,
       (d) a bearing for making said rotary sleeve rotatable relative to said stationary shaft,
       (e) a rotary polygon mirror fixed to said rotary sleeve, said rotary polygon mirror having a first rotation correcting portion, and
       (f) a drive magnet fixed to said rotary sleeve, said drive magnet having a second rotation correcting portion; and
    a stationary unit with which said rotary unit is coupled, said stationary unit having
       (g) a stator coil opposed to said drive magnet and located on a side of the outer periphery of said drive magnet, when said stationary and rotary units are coupled,
       (h) a magnetic member disposed around said stator coil, and
       (i) a base on which said stator coil and said magnetic member are mounted, said base having a hole in which said motor housing is set to fit and having a second mount portion to be mounted to said first mount portion of the rotary unit,
    whereby said rotary part may be separated from said stationary part to permit access to said second correction portion without requiring disassembly of said bearing.

11. The scanner motor according to claim 10, wherein said first mount portion of the rotary unit and said second mount portion of the stationary unit each have respective mount surfaces to become respective mount references and wherein the mount surfaces are set to fit with each other and then are screwed to each other.

12. The scanner motor according to claim 11, wherein an outer peripheral surface of a cup-shaped portion of said motor housing and an inner peripheral surface of the hole in said base both are processed with high precision, and said motor housing is set to fit in the hole of said base when said rotary unit is coupled with said stationary unit.

13. The scanner motor according to claim 10, wherein said rotary part has means for magnetically floating said rotary sleeve relative to said motor housing.

14. The scanner motor according to claim 13, wherein said means for magnetically floating said rotary sleeve has a first permanent magnet disposed on said motor housing and a second permanent magnet disposed on said rotary sleeve, wherein a floating force is obtained by a repulsive force between the first permanent magnet and second permanent magnet, wherein a third permanent magnet is further provided on said motor housing, and the height of said rotary polygon mirror fixed to said rotary sleeve is determined by mount positions of said third permanent magnet and said second permanent magnet.

15. An inner rotor type scanner motor comprising:
    a rotary unit comprising a first mount portion, said rotary unit having
       (a) a bearing,
       (b) a motor housing for holding said bearing, said motor housing having said first mount portion,
       (c) a rotary shaft arranged as rotatable relative to said bearing,
       (d) a rotary polygon mirror fixed to said rotary shaft, said rotary polygon mirror having a first rotation correcting portion, and
       (e) a drive magnet fixed to said rotary shaft, said drive magnet having a second rotation correcting portion; and a stationary unit which is one of two units of which said motor is composed, said rotary unit being the other unit of which said motor is composed, wherein said stationary unit comprises a second mount portion to be mounted to said first mount portion of said rotary unit in order to achieve coupling of said stationary unit with said rotary unit, said rotary unit having (g) a stator coil opposed to said drive magnet and disposed on a side of the outer periphery of the drive magnet, when said stationary and rotary units are coupled, (h) a magnetic member disposed around said stator coil, and (i) a base on which said stator coil and said magnetic member are mounted, said base having a hole in which said motor housing is set to fit, and having the second mount portion to be mounted to the first mount portion of said rotary unit, whereby said rotary part may be separated from said stationary part to permit access to said second correction portion without requiring disassembly of said bearing.

16. The scanner motor according to claim 15, wherein said bearing is a ball bearing.

* * * * *